O. SPAHR.
VALVE ATTACHMENT.
APPLICATION FILED JAN. 28, 1916.
1,364,147.
Patented Jan. 4, 1921.
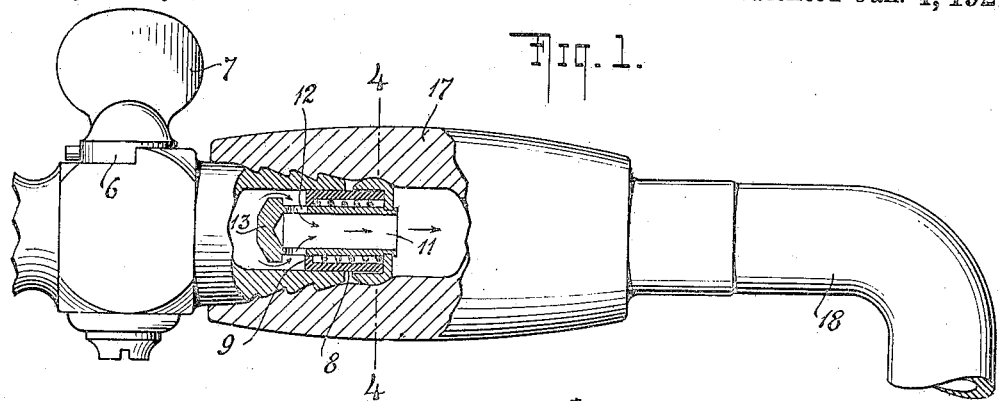
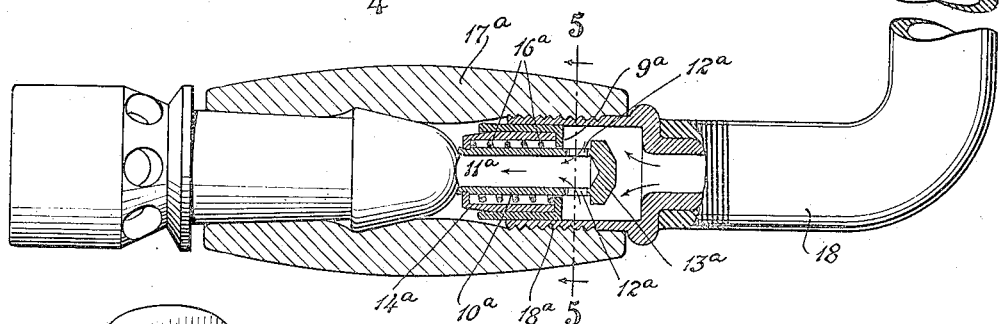
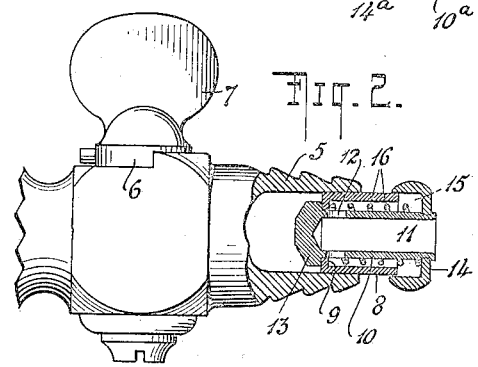
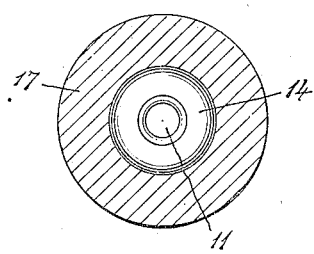
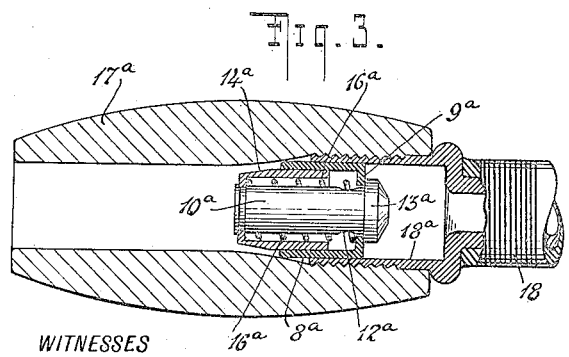
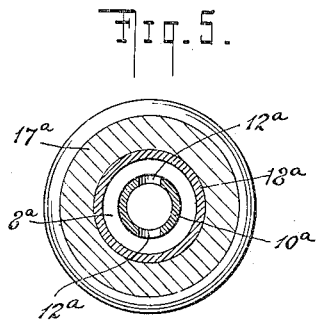
WITNESSES
INVENTOR
Otto Spahr
BY
ATTORNEYS

UNITED STATES PATENT OFFICE.

OTTO SPAHR, OF PHILADELPHIA, PENNSYLVANIA, ASSIGNOR TO STRAUSE GAS IRON CO., OF PHILADELPHIA, PENNSYLVANIA, A CORPORATION OF PENNSYLVANIA.

VALVE ATTACHMENT.

1,364,147.  Specification of Letters Patent.  Patented Jan. 4, 1921.

Application filed January 28, 1916. Serial No. 74,826.

*To all whom it may concern:*

Be it known that I, OTTO SPAHR, a citizen of the United States, and resident of Philadelphia, county of Philadelphia, State of Pennsylvania, have invented certain new and useful Improvements in Valve Attachments, of which the following is a specification.

My invention relates to valve attachments, more particularly adapted for use in combination with the usual detachable fuel conducting tubes and gas-cocks and gas-stoves, gas lamps, gas-irons and the like connected thereby and has for its object to provide a simple and efficient arrangement whereby the fuel supply is automatically discontinued if the connection becomes accidentally or unintentionally disengaged or broken. The particular purpose of my invention is to provide an attachment which may be readily combined with fixtures and tubing of existing types without necessitating any changes or special construction in either. My improvement will be fully described hereinafter and the features of novelty will be pointed out in the appended claims.

In the accompanying drawings the invention, by way of example, is shown as combined with a gas-cock and a flexible tubing for connecting said cock with an appliance using gas as a fuel, it being understood that the attachment is equally well adapted for use in other arrangements where a safety attachment for automatically preventing unintentional escape of a gaseous or liquid fluid is desired. In said drawings Figure 1 is an elevation partly in section showing my attachment in an open position. Figs. 2 and 3 are detail sections showing the parts in a closed position; Fig. 4 is a cross-section in the line 4—4 of Fig. 1 and Fig. 5 is a similar view on the line 5—5 of Fig. 1.

Referring to the drawings 5 represents the nozzle of an ordinary gas-cock or other fixture which communicates with a source of gas or other fuel and which is manually controlled by means of the usual valve 6 having an operating handle 7. As shown in the illustration my attachment comprises a sleeve 8 which is inserted into the end of said nozzle 5 preferably so as to project out of same and which is connected with said nozzle 5 either simply by friction or in any other way as may be desired. At its inner end this sleeve is provided with an annular inwardly extending flange 9 which forms an axial opening for the accommodation of a member 10 slidable relatively to said sleeve in an axial direction. The said member 10 is provided with an axial passage 11 closed at its inner end and open at its outer end and is further formed with one or more radial apertures 12 located at a distance from its inner end as shown in Fig. 1. The said member 10 further carries an annular enlargement or projection 13 at its inner end, which enlargement in the normal condition of the parts engages the flange 9 and serves the double purpose of arresting the axial movement of the member 10 in one direction and of sealing the connection between the passage 11 thereof and the interior of the nozzle 5. At its outer end the member 10 is provided with a recessed element or ring 14 rigidly secured to said member 10 and cored out as at 15 to slidably fit over the projecting portion of the sleeve 8, said ring preferably having its outer surface curved transversely and having an outer diameter corresponding substantially to the outer diameter of the nozzle 5 at its free end. A coil spring 16 surrounds the member 10 and abuts with its one end against the flange 9 and with its other end against the ring 14, said spring 16 being thus at all times completely inclosed and serving to maintain the parts in and return them to their normal positions in which communication between the passage 11 and the interior of the nozzle 5 is cut off owing to the fact that the radial apertures are positioned in the sleeve 8 beyond the flange 9 and the annular enlargement 13 is in surface engagement with said flange 9 as shown in Fig. 2. As long as the parts are in this position no gas or other fuel can find its way out of the nozzle 5 even if the valve 6 is open. When however the usual tubular coupling member 17 of the customary gas tubing 18 is connected with the nozzle 5 and forced home thereon, the inner surface of said coupling member 17 will frictionally engage the periphery of the ring 14 and will thus move the latter inwardly toward the nozzle 5 against the tension of the spring 16. This will cause the member 10 to be similarly moved and in consequence brings about a movement of the annular enlargement 13 away from the flange 9 and thus shifts the radial apertures 12 from a position within the sleeve 8 to a point beyond the flange 9 in which communication between the passage 11 and the interior of the nozzle 5 is established through said apertures. In this position of the parts the gas or other fuel is thus free to flow from the nozzle 5, through the apertures 12 into the passage 11 and to the tubing 18. If the coupling member 17 is pulled from the nozzle 5, either accidentally or intentionally the frictional engagement between said member 17 and the ring 14 will cause the parts to be operated in a reverse direction and the apertures 12 and enlargement 13 to be returned to their normal positions in which communication between the passage 11 and the interior of the nozzle 5 is again cut off. If the withdrawal of the coupling member 17 from the nozzle 5 is so sudden as to cause a relative movement between the said member 17 and ring 14 without bringing about an actuation of the latter in said reverse direction, the spring 16 will return the parts to their normal position as soon as the coupling member 17 has become disconnected from the nozzle 5. In either case the flow of gas or other fluid from the nozzle 5 is instantly cut off the moment the coupling member 17 and nozzle 5 are disengaged one from the other, this result being accomplished even if the valve 6 is open and without requiring said valve to be closed. It will be understood that the movement of the member 10 under the influence of the spring 16 is always arrested by its enlargement 13 before the ring has been moved completely from the sleeve 8 so that these elements never become disconnected.

In order to still further guard against the unintentional escape of gas or other fluid, the opposite end of the tubing 18 which is intended for connection with the nozzle of a gas stove, gas lamp, gas iron or any other element to which gas or other fluid is to be conducted by said tubing is also provided with my improved attachment. In this case a sleeve $8^a$ corresponding to the sleeve 8 is frictionally or otherwise secured in the end of the tubing 18 or in a tube $18^a$ which forms part thereof and is similarly provided at one end with an annular flange $9^a$, which likewise forms an axial opening for a member $10^a$ corresponding to the member 10. This member $10^a$ is formed with an axial passage $11^a$ with which radial apertures $12^a$ communicate and also carries at its one end an annular enlargement $13^a$, these elements being substantially the same as the elements 10, 11, 12 and 13 and serving a similar purpose. The opposite end of said member $10^a$ is rigidly connected with a recessed or cup-shaped element $14^a$ slidable in said sleeve $8^a$ and forming an abutment for one end of a spring $16^a$, the opposite end of which engages the flange $9^a$. The said spring $16^a$ is thus inclosed and protected at all times in substantially the same way as is the spring 16. The enlargement $13^a$ in addition to controlling the communication between the passage $11^a$ and the tubing 18 also serves to arrest the movement of the member $10^a$ in one direction and prevents the element $14^a$ from being completely forced out of the sleeve $8^a$ by the spring $16^a$. By referring to Figs. 1 and 3 it will be seen that the coupling member $17^a$ surrounds and extends beyond the sleeve $8^a$ and its coöperating parts and that the spring $16^a$ exerts a tension tending to move the member $10^a$ toward the free end of said coupling member $17^a$. Thus as the latter is connected with the nozzle $5^a$ which as before stated may be part of a gas-stove, gas-lamp, gas-iron, etc., and is forced home thereon, the end of said nozzle $5^a$ will finally come into engagement with the element $14^a$ and as the operation of connecting the member $17^a$ with the nozzle $5^a$ is continued, will exert a pressure thereon. In this manner the member $10^a$ will be moved against the tension of the spring $16^a$ and the enlargement $13^a$ will be moved away from the flange $9^a$ while the radial apertures $12^a$ will be moved out of the sleeve $8^a$ and beyond the flange $9^a$ so that communication between the nozzle $5^a$ and the interior of the tubing 18 is established. In this condition of the parts, which will obtain as long as the member $17^a$ remains freely and properly upon the nozzle $5^a$, the gas or other fluid is thus free to pass from the tubing 18, through the apertures $12^a$ to the passage $11^a$ and from thence to the nozzle $5^a$ and place of consumption or use. As soon however as said member $17^a$ is pulled partly or entirely from said nozzle $5^a$ the spring $16^a$ will return the member $10^a$ to its normal position in which the apertures $12^a$ are within the sleeve $8^a$ and the enlargement $13^a$ is in engagement with the flange $9^a$ and communication between the tubing 18 and the nozzle $5^a$ is in consequence cut off. If the said coupling member $17^a$ is entirely disconnected from the nozzle $5^a$ the free end of said tubing will be sealed by the attachment so that it is impossible for gas or other fluid to escape from said tubing even if the valve 6 of the gas cock or the like remains in its open position.

The accidental or unintentional escape of gas or other fluid is thus automatically cut off no matter which end of the tubing is disengaged so that the danger of escaping fluid due to negligence or carelessness is absolutely overcome. The attachment which is carried by the tubing 18 itself, also makes it necessary to properly connect said tubing 18 with the nozzle $5^a$ or its equivalent before a proper supply of fluid to the place of consumption is secured. The danger of leakage due to an imperfect connection of the tube with a gas stove, gas-lamp, gas iron and the like is thus also avoided.

In both instances the enlargements 13 and 13ᵃ are preferably of a minimum diameter consistent with the intended operation in order that the danger of dirt and foreign matter becoming lodged between said enlargements and the flanges 9 and 9ᵃ is reduced to a minimum and so that the space between the peripheries of said enlargements and the inner surfaces of the nozzle 5 and tube 18ᵃ respectively is as large as possible to permit a free passage of the fuel to the passages 11 and 11ᵃ when the valves are open. These passages themselves are further made with as large an inner diameter as possible in order that the free flow of the fuel from the nozzle 5 to the nozzle 5ᵃ is not interfered with to any appreciable extent. The cup-shaped or recessed element 14ᵃ is of smaller outer diameter throughout than the casing 8ᵃ and tube 18ᵃ and is preferably tapered toward its free end in order that the coupling member 17 may be attached to the tube 18ᵃ without interference with said element 14ᵃ and so that the latter may operate without interference with said coupling member 17 as will be readily apparent.

The attachment is simple and efficient in operation and as will be seen may readily be combined with existing fixtures and tubing in an effective manner without requiring any changes in the form and construction of the fixture or of the tubing. The attachment further may be manufactured cheaply, is easily kept in perfect working order and does not require the use of any packings or the like. In this connection it will be noted that the pressure of the gas or other fluid itself tends to force the projections or enlargements 13 and 13ᵃ toward the flanges 9 and 9ᵃ and thus in case of necessity assists the springs 16 and 16ᵃ in producing tight closures and preventing leakage at these points. While I have shown and described my improvement in connection with gas cocks and gas fixtures it will be understood that this is only an example as it is obvious that my attachment is equally well adapted for use in combination with any arrangement including a detachable connection whereby a fluid, gaseous or liquid is conducted from one point to another and in which it is desirable to prevent accidental escape of such fluid, due to an unintentional breaking of the connection and to overcome the dangers of negligence and carelessness.

If desired both sleeves 8 and 8ᵃ may be provided with means such as an annular flange arranged to abut against the end of the nozzle 5 or the tube 18ᵃ and whereby the inward movement of said sleeves is arrested at the desired or predetermined point.

By having the springs 16 and 16ᵃ completely inclosed as shown and described the same are protected from contact with the particular fluid which the particular tubing is intended to conduct and are thus prevented from being injuriously affected thereby.

It will be understood that when I speak of the coupling members 17 and 17ᵃ as being combined with their coöperating nozzles or the like by a movement in an axial direction, I mean to include an arrangement in which the connection is a screw-threaded one as well as the purely frictional connection shown and described.

Various changes in the specific form shown and described may be made within the scope of the claims without departing from the spirit of my invention.

I claim:—

1. The combination of a gas fixture including a nozzle, a sleeve fitted into the free end of said nozzle in surface engagement therewith, said sleeve projecting exteriorly beyond said free end, a tubular stem extending axially of said sleeve, a valve at one end of said stem, and a ring at the other end of said stem in sliding surface engagement with the outer surface of said sleeve, said ring being arranged for peripheral, frictional engagement with the interior surface of a fuel hose whereby said valve is actuated as said hose is attached to and removed from said nozzle.

2. The combination of a gas fixture including a nozzle, a sleeve fitted into the free end of said nozzle and projecting exteriorly thereof, a valve movable in said sleeve whereby the flow of gas from said nozzle is controlled, a fuel hose having an end detachably connected directly with said nozzle and having no contact with said sleeve, and a member connected with said valve and actuated by peripheral frictional engagement with said fuel hose as it is connected with and disconnected from said nozzle to open and close said valve.

In testimony whereof I have hereunto set my hand.

OTTO SPAHR.